(12) United States Patent
Kurokawa

(10) Patent No.: US 10,377,424 B2
(45) Date of Patent: Aug. 13, 2019

(54) TRACTOR BONNET

(71) Applicant: YANMAR CO., LTD., Osaka-shi, Osaka (JP)

(72) Inventor: Yoshiaki Kurokawa, Osaka (JP)

(73) Assignee: YANMAR CO., LTD., Osaka (JP)

( * ) Notice: Subject to any disclaimer, the term of this patent is extended or adjusted under 35 U.S.C. 154(b) by 139 days.

(21) Appl. No.: 15/521,457

(22) PCT Filed: Oct. 21, 2015

(86) PCT No.: PCT/JP2015/079754
§ 371 (c)(1),
(2) Date: Apr. 24, 2017

(87) PCT Pub. No.: WO2016/063927
PCT Pub. Date: Apr. 28, 2016

(65) Prior Publication Data
US 2017/0313362 A1 Nov. 2, 2017

(30) Foreign Application Priority Data
Oct. 24, 2014 (JP) .................. 2014-217862

(51) Int. Cl.
*B62D 25/10* (2006.01)
*B62D 25/12* (2006.01)
*B62D 49/00* (2006.01)
*B60Q 1/04* (2006.01)

(52) U.S. Cl.
CPC .............. *B62D 25/12* (2013.01); *B60Q 1/04* (2013.01); *B62D 25/10* (2013.01); *B62D 49/00* (2013.01); *B60Y 2200/221* (2013.01)

(58) Field of Classification Search
CPC .............................. B62D 25/10; B62D 25/12
See application file for complete search history.

(56) References Cited

U.S. PATENT DOCUMENTS 3,628,622 A * 12/1971 Kiwitz ................. B62D 25/10
180/69.21
4,805,264 A * 2/1989 Benning ............... E05D 7/1066
16/267

(Continued)

FOREIGN PATENT DOCUMENTS

CN         1342862 A     4/2002
CN       101253063 A     8/2008

(Continued)

OTHER PUBLICATIONS

Extended European Search Report for corresponding Application No. 15851688.0-1755/3210858 PCT/JP2015079754; dated Sep. 14, 2017.

(Continued)

*Primary Examiner* — Erez Gurari
(74) *Attorney, Agent, or Firm* — Norton Rose Fulbright US LLP

(57) ABSTRACT

In a bonnet of a tractor having an upper cover and a pair of lower covers, the upper cover has a center line formed from a front end point up to a diagonally-rearward midpoint, and the upper cover is provided with two opening parts sandwiching the center line. In addition, the opening parts are disposed so that one side of each follows the center line.

13 Claims, 14 Drawing Sheets

(56) References Cited

U.S. PATENT DOCUMENTS

| | | | | |
|---|---|---|---|---|
| 4,889,203 | A * | 12/1989 | Hagarty | B62D 25/10 180/69.24 |
| D310,374 | S * | 9/1990 | Westimayer | D15/15 |
| D381,341 | S * | 7/1997 | Goebert | D15/17 |
| 5,645,133 | A * | 7/1997 | Thompson | E05D 7/105 16/254 |
| 6,447,152 | B1 * | 9/2002 | Goebert | B60Q 1/0035 362/485 |
| D466,531 | S * | 12/2002 | Hohnl | D15/31 |
| D537,454 | S * | 2/2007 | Higashikawa | D15/23 |
| 9,174,682 | B2 * | 11/2015 | Schmitz | B62D 25/10 |
| D749,144 | S * | 2/2016 | Higashikawa | D15/23 |
| 9,528,309 | B2 * | 12/2016 | Fisher | E05D 7/1083 |
| 2001/0004949 | A1 * | 6/2001 | Burgo | B62D 25/10 180/69.2 |
| 2003/0057005 | A1 * | 3/2003 | Nagai | B60K 11/08 180/68.1 |
| 2003/0075371 | A1 * | 4/2003 | Haun | B62D 25/10 180/69.21 |
| 2006/0108813 | A1 * | 5/2006 | Goebert | B62D 25/10 293/115 |
| 2013/0025954 | A1 * | 1/2013 | Miller | B62D 25/10 180/69.21 |
| 2014/0070569 | A1 | 3/2014 | Chmitz et al. | |
| 2014/0231161 | A1 * | 8/2014 | Lehti | B62D 25/12 180/68.1 |
| 2016/0152278 | A1 * | 6/2016 | Kawashiri | B60Q 1/0035 180/89.1 |
| 2016/0368365 | A1 * | 12/2016 | Jackson | F01P 7/10 |
| 2017/0021721 | A1 * | 1/2017 | Kurokawa | B60K 11/06 |
| 2017/0129542 | A1 * | 5/2017 | Kurokawa | A01B 69/02 |
| 2017/0313362 | A1 * | 11/2017 | Kurokawa | B62D 25/10 |
| 2018/0304936 | A1 * | 10/2018 | Watabe | B60K 11/04 |

FOREIGN PATENT DOCUMENTS

| | | |
|---|---|---|
| EP | 1652756 A2 | 5/2006 |
| JP | 2005-306055 A | 11/2005 |
| JP | 2010163036 A | 7/2010 |
| JP | 2010274894 A | 12/2010 |

OTHER PUBLICATIONS

International Search Report corresponding to Application No. PCT/JP2015/079754; dated Jan. 19, 2016, with English translation.

Chinese Office Action dated Aug. 21, 2018 issued in corresponding CN Application 2018081601549940 cites the patent document above.

* cited by examiner

TRACTOR BONNET

This is the U.S. national stage of application No. PCT/JP2015/079754, filed on Oct. 21, 2015. Priority under 35 U.S.C. § 119(a) and 35 U.S.C. § 365(b) is claimed from Japanese Application No. 2014-217862, filed on Oct. 24, 2014, the disclosure of which is also incorporated herein by reference.

TECHNICAL FIELD

The present invention relates to a tractor bonnet.

BACKGROUND ART

Conventionally, tractors used for a farm field have been known (for example Patent Literature 1). The tractor has a front portion provided with a bonnet, and an engine installed in the bonnet. The bonnet includes an upper cover and a pair of lower covers.

The bonnet is required to enable air to flow into and out of the bonnet. This is for supplying outer air to the engine and for preventing heat produced by engine from accumulating in the bonnet. When an opening part is provided to the bonnet, the rigidity of the bonnet might be compromised due to the shape or the like of the opening part. Thus, a bonnet achieving a higher flowability of air while maintaining a high rigidity has been called for.

CITATION LIST

Patent Literature

PTL 1: Japanese Unexamined Patent Application Publication No. 2010-163036

SUMMARY OF INVENTION

Technical Problem

An object of the present invention is to provide a bonnet achieving a higher flowability of air while maintaining a high rigidity.

Solution to Problem

A first aspect of the present invention is a bonnet of a tractor including: an upper cover; and a pair of lower covers. The upper cover has a center line formed from a front end point to a diagonally-rearward midpoint. The upper cover is provided with two opening parts sandwiching the center line.

A second aspect of the present invention is the bonnet of a tractor according to the first aspect in which the opening parts are each disposed with one side extending along the center line.

A third aspect of the present invention is the bonnet of a tractor according to the first or second aspect in which an outline is formed on the upper cover to laterally extend from the front end point, and the opening parts are each disposed with one side extending along the outline.

A fourth aspect of the present invention is the bonnet of a tractor according to any one of the first to third aspects in which a side line is formed on the upper cover to laterally extend from the midpoint, and the opening parts are each disposed with one side extending along the side line.

A fifth aspect of the present invention is the bonnet of a tractor according to any one of the first to fourth aspects in which a light unit is fit to the lower covers, and the opening parts are each disposed with one side extending along an end line of the light unit.

A sixth aspect of the present invention is a tractor including the bonnet according to any one of said aspects of the present invention.

Advantageous Effects of Invention

The present invention can achieve the following advantageous effects.

According to the first aspect of the present invention, the upper cover has a center line formed from a front end point to a diagonally-rearward midpoint. The upper cover is provided with two opening parts sandwiching the center line. Thus, the bonnet can achieve a higher flowability of air with a large opening area guaranteed.

According to the second aspect of the present invention, the opening parts are each disposed with one side extending along the center line. Thus, the bonnet has a center line portion serving as a pillar (structural column), whereby a high rigidity can be maintained.

According to the third aspect of the present invention, an outline is formed on the upper cover to laterally extend from the front end point. The opening parts are each disposed with one side extending along the outline. Thus, the bonnet has an outline portion serving as a beam (structural beam), whereby a high rigidity can be maintained.

According to the fourth aspect of the present invention, a side line is formed on the upper cover to laterally extend from the midpoint. The opening parts are each disposed with one side extending along the side line. Thus, the bonnet has a side line portion serving as a beam (structural beam), whereby a high rigidity can be maintained.

According to the fifth aspect of the present invention, a light unit is fit to the lower covers. The opening parts are each disposed with one side extending along an end line of the light unit. Thus, the bonnet has a rear edge of the light unit aligned with one side of the opening part, whereby an aesthetic design can be achieved.

According to the sixth aspect of the present invention, the tractor according to the present invention includes the bonnet according to any one of said aspects of the present invention. The tractor is advantageous over conventional tractors in the points described above.

DESCRIPTION OF EMBODIMENTS

The technical idea of the present invention can be applied to any farm work machines and construction machines.

First of all, a tractor 1 is briefly described.

Figure 1:
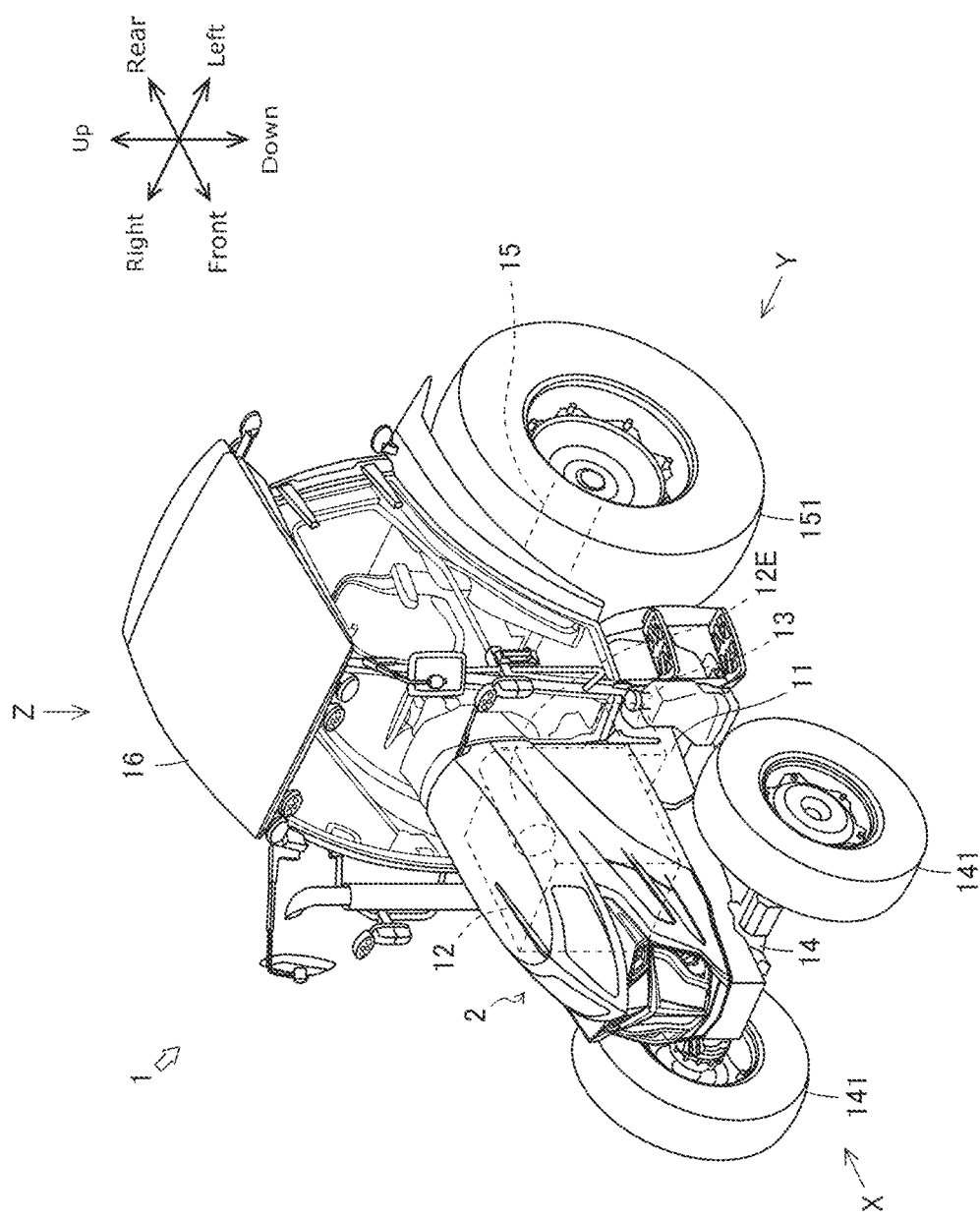
FIG. 1 is a diagram illustrating a tractor.
Figure 2:
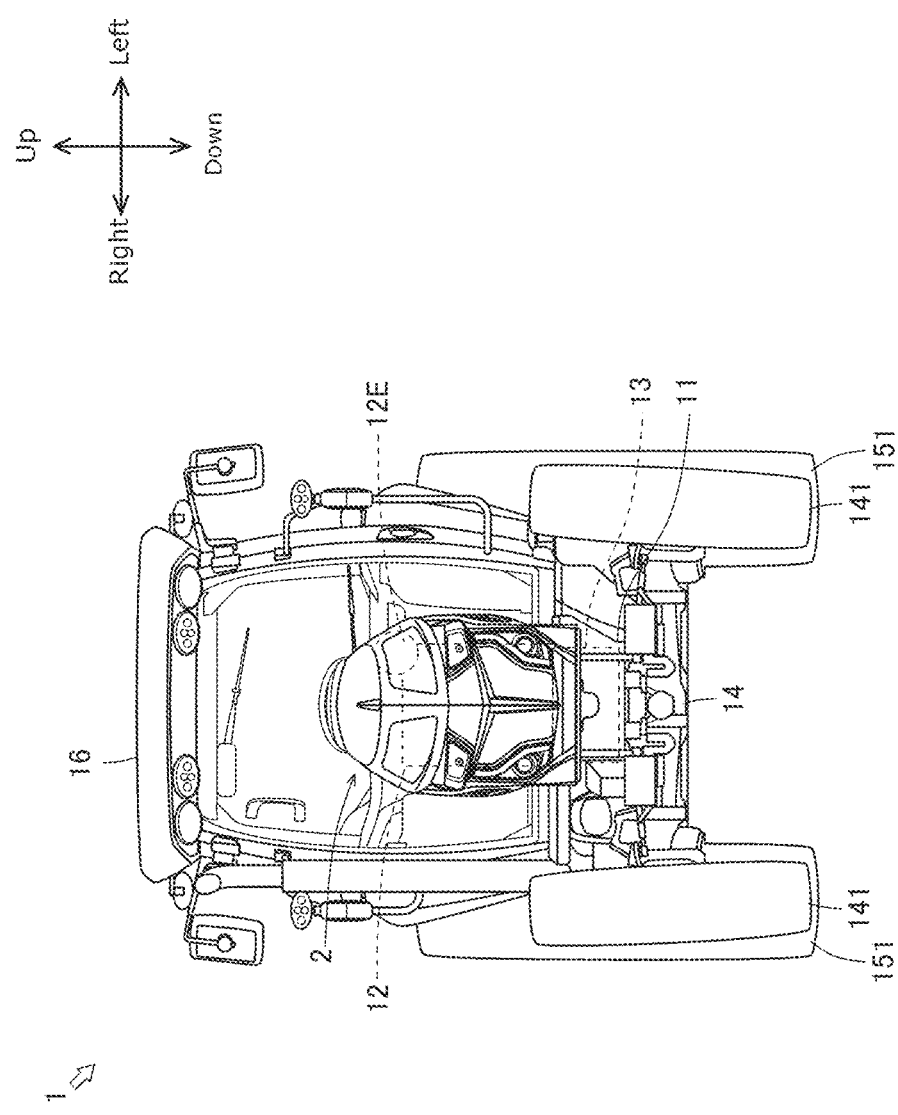
FIG. 2 is a diagram as viewed in a direction of an arrow X in FIG. 1.
Figure 3:
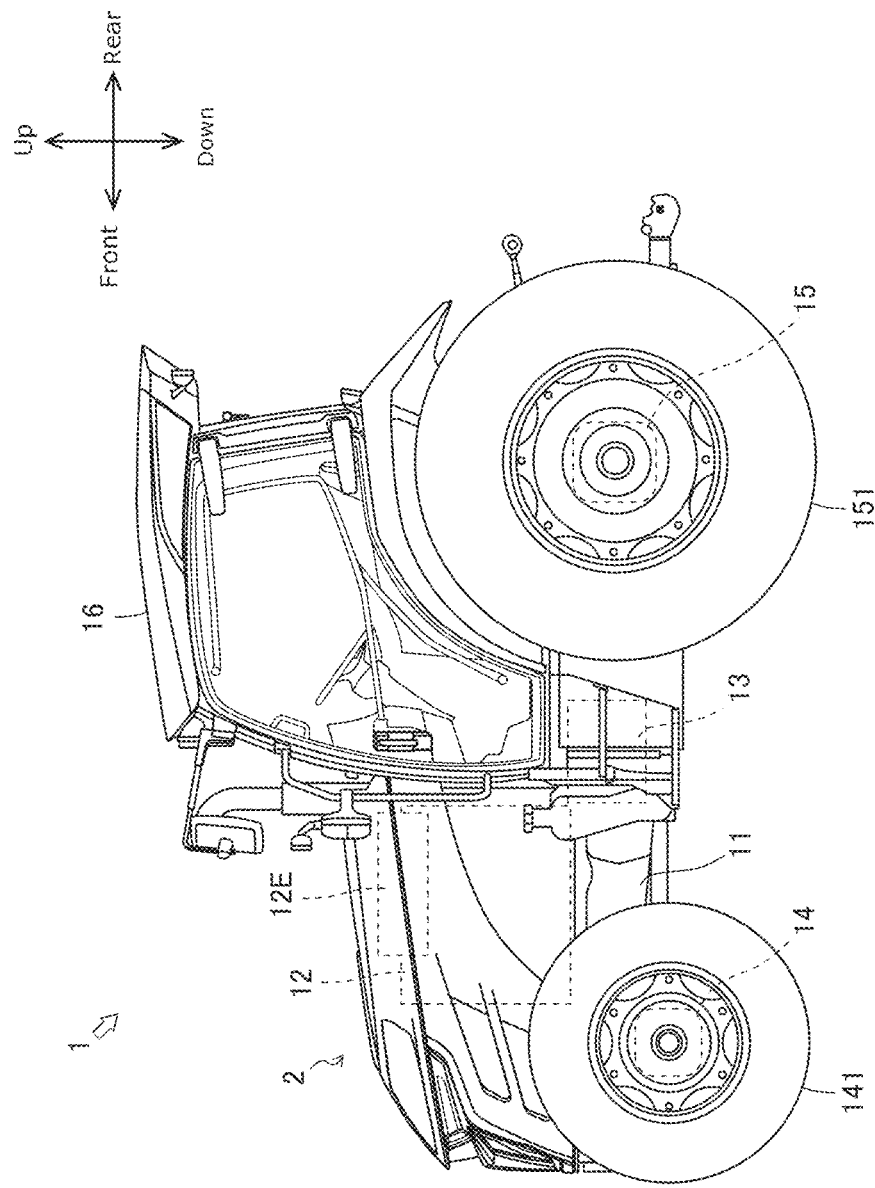
FIG. 3 is a diagram as viewed in a direction of an arrow Y in FIG. 1.
Figure 4:
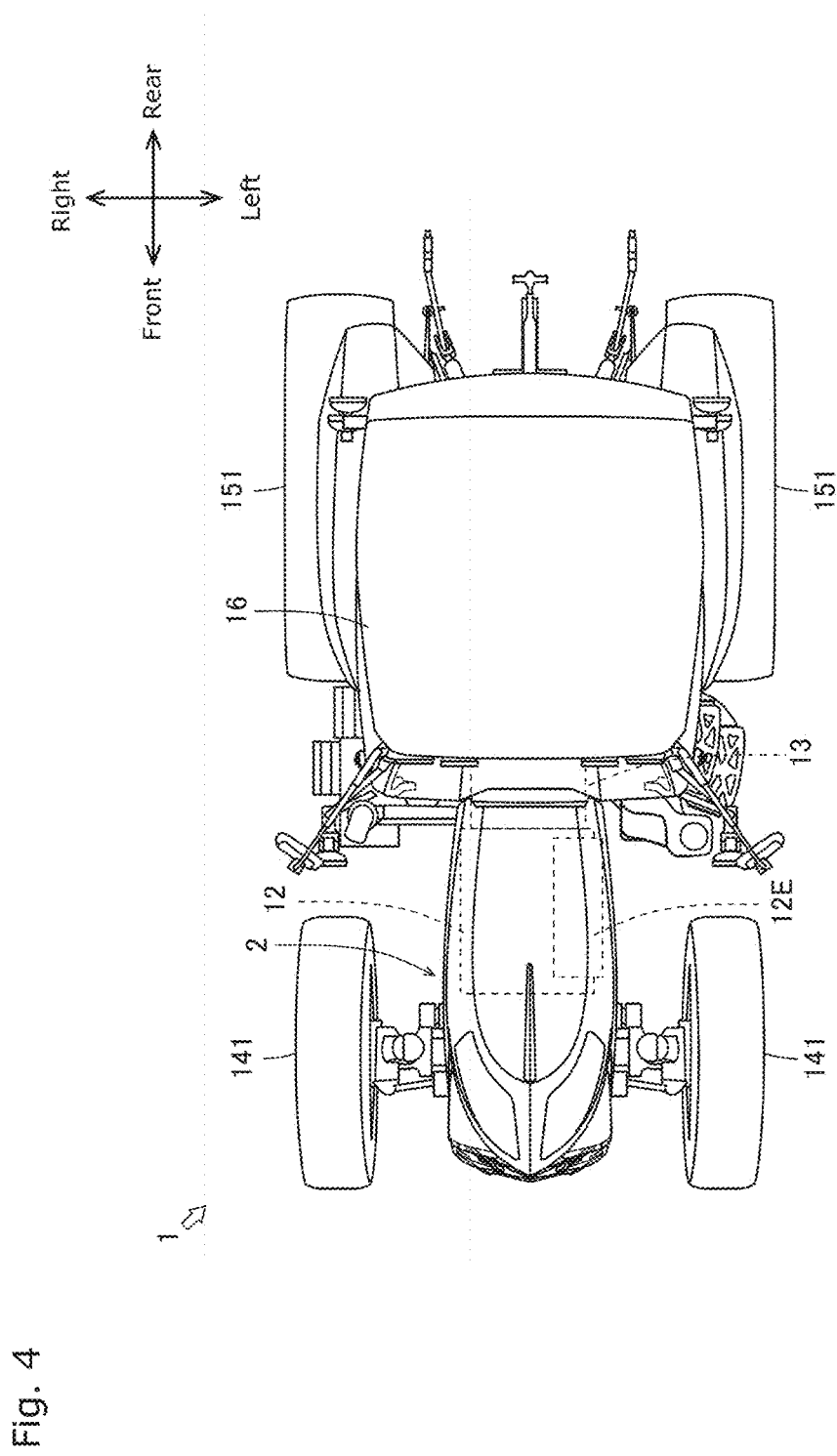
FIG. 4 is a diagram as viewed in a direction of an arrow Z in FIG. 1.

FIG. 1 illustrates the tractor 1. FIG. 2 is a diagram as viewed in a direction of an arrow X in FIG. 1. FIG. 3 is a diagram as viewed in a direction of an arrow Y in FIG. 1. FIG. 4 is a diagram as viewed in a direction of an arrow Z in FIG. 1. In the figures, a front and rear direction, a left and right direction, and an upper and lower direction of the tractor 1 are illustrated.

The tractor 1 mainly includes a chassis frame 11, an engine 12, a transmission 13, a front axle 14, and a rear axle 15. The tractor 1 further includes a cabin 16 for protecting an operator from wind and rain, and a bonnet 2 that protects the engine 12 from wind and rain.

The chassis frame 11 serves as a frame of the tractor 1. Components, such as the engine 12 described below, are attached to the chassis frame 11.

The engine 12 converts thermal energy, as a result of burning fuel, into kinetic energy. In other words, the engine 12 generates rotational driving force through fuel combustion. The engine 12 is connected to a control device. When an operator operates an acceleration pedal, the control device changes a driving state of the engine 12 in accordance with the operation. The engine 12 is provided with an exhaust gas purification device 12E. The exhaust gas purification device 12E oxidizes particulate matters (PM), carbon monoxide (CO), and hydrocarbon (HC) in exhaust gas.

The transmission 13 transmits the rotational driving force from the engine 12 to the front axle 14 and the rear axle 15. The rotational driving force from the engine 12 is input to the transmission 13 via a coupling mechanism. The transmission 13 is provided with a continuously variable transmission. When the operator operates a shift lever, the continuously variable transmission changes an operation state of the transmission 13 in accordance with the operation.

The front axle 14 transmits the rotational driving force from the engine 12 to front wheels 141. The rotational driving force from the engine 12 is input to the front axle 14 via the transmission 13. A steering device is arranged side by side with the front axle 14. When the operator operates a steering wheel, the steering device changes a steering angle of the front wheels 141 in accordance with the operation.

The rear axle 15 transmits the rotational driving force from the engine 12 to rear wheels 151. The rotational driving force from the engine 12 is input to the rear axle 15 via the transmission 13. The rear axle 15 is provided with a PTO output device. When the operator operates a switch, the PTO output device inputs the rotational driving force to a work machine being towed.

Next, the bonnet 2 is described.

Figure 5:
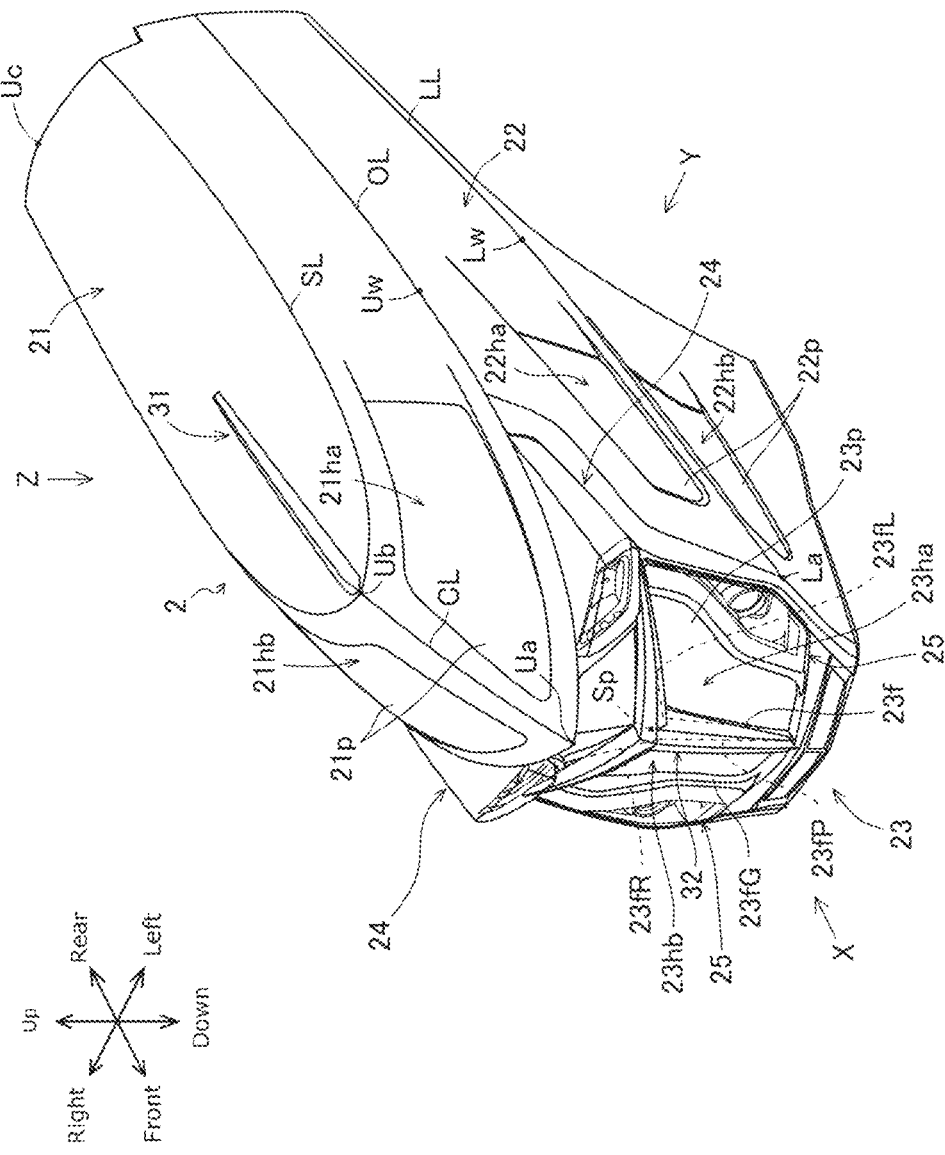
FIG. 5 is a diagram illustrating a bonnet.
Figure 6:
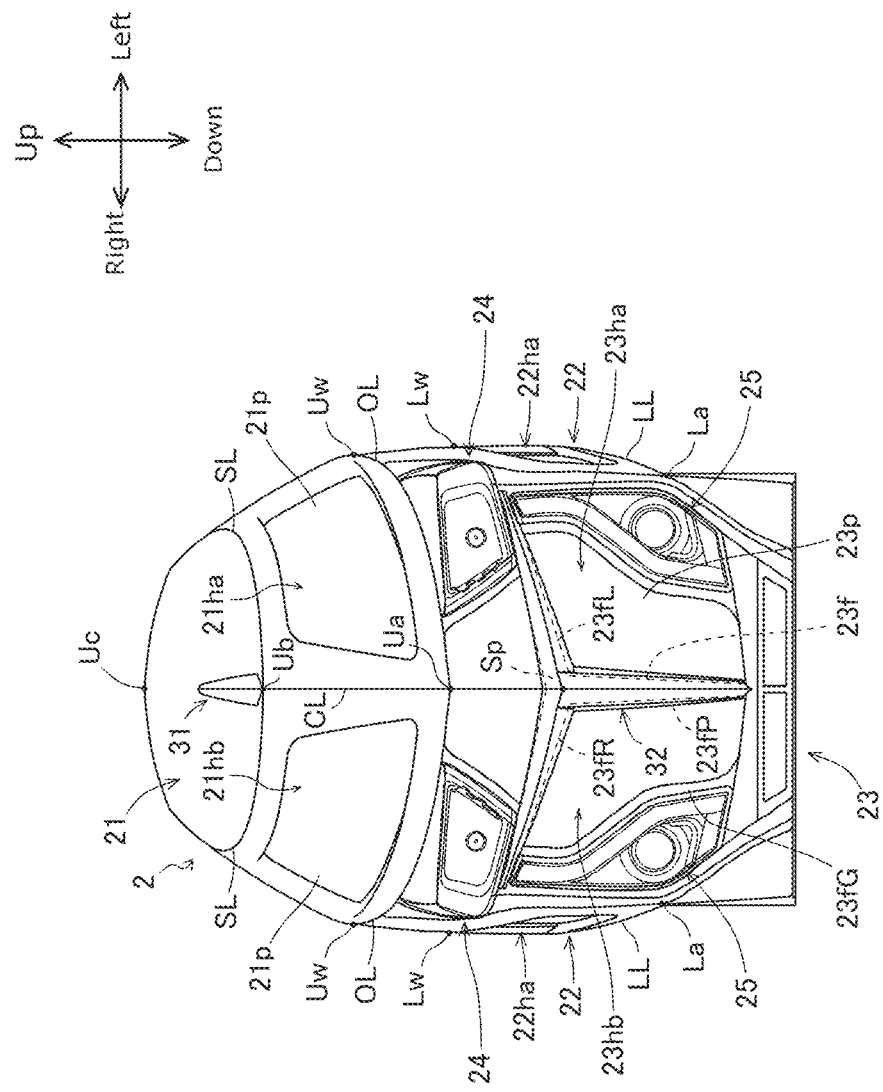
FIG. 6 is a diagram as viewed in a direction of an arrow X in FIG. 5.
Figure 7:
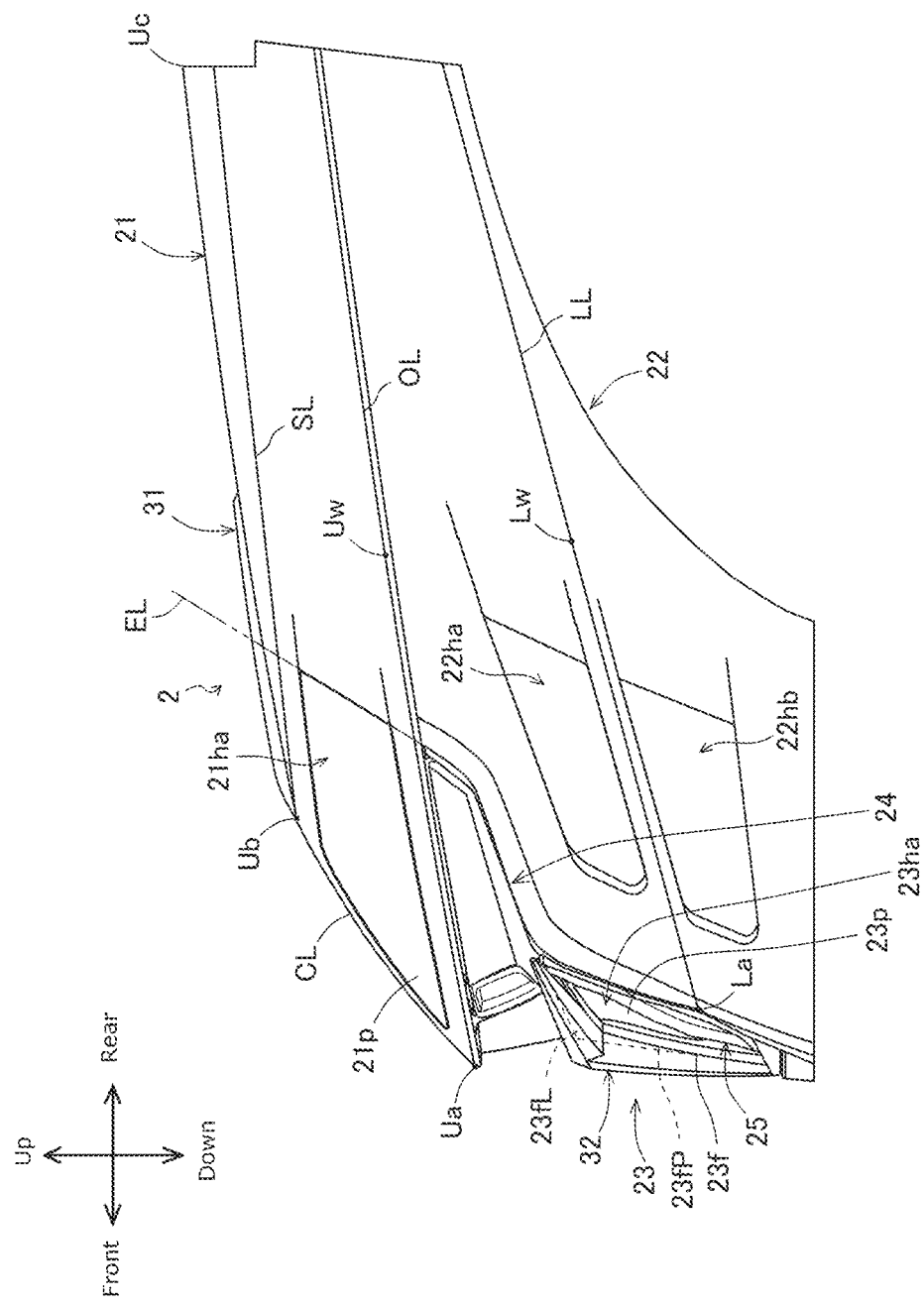
FIG. 7 is a diagram as viewed in a direction of an arrow Y in FIG. 5.
Figure 8:
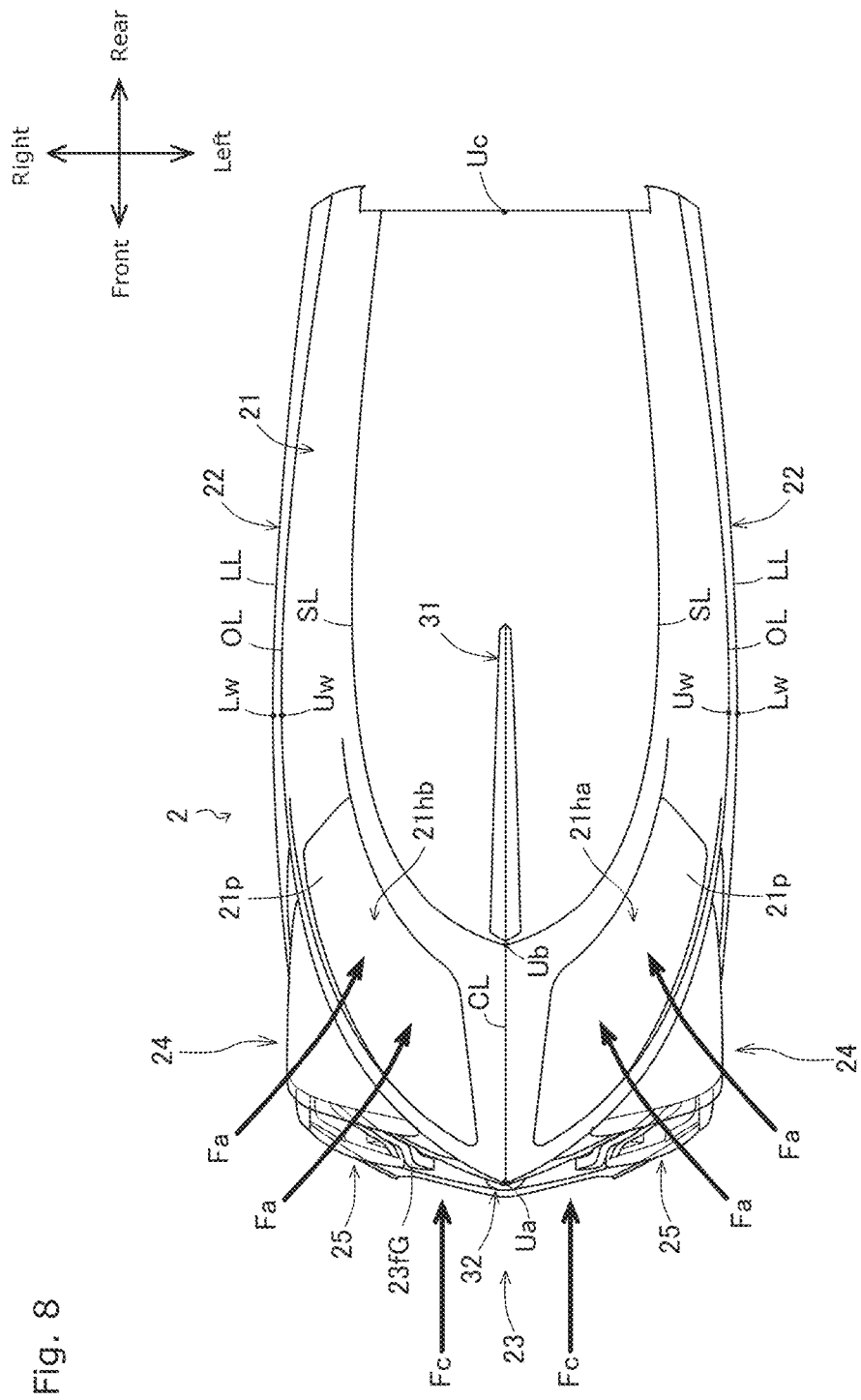
FIG. 8 is a diagram as viewed in a direction of an arrow Z in FIG. 5.

FIG. 5 illustrates the bonnet 2. FIG. 6 is a diagram as viewed in a direction of an arrow X in FIG. 5. FIG. 7 is a diagram as viewed in a direction of an arrow Y in FIG. 5. FIG. 8 is a diagram as viewed in a direction of an arrow Z in FIG. 5. In the figures, the front and rear direction, the left and right direction, and the upper and lower direction of the tractor 1 are illustrated.

The bonnet 2 includes an upper cover 21 and a pair of lower covers 22. The bonnet 2 has a front surface having a front grille 23.

The upper cover 21 is an exterior part that covers an upper side of the engine 12. The upper cover 21 bulges in a section between its front end point Ua and a diagonally-rearward midpoint Ub, and is gently curved in a section between the midpoint Ub and a rear end point Uc. The upper cover 21 laterally extends from the front end point Ua in such a manner as to have a gently curved shape (hereinafter, referred to as an "outline OL") with a largest width portion defined at side end points Uw. The upper cover 21 has a character line (hereinafter, referred to as a "center line CL") extending between the front end point Ua and the midpoint Ub, and has character lines (hereinafter, referred to as "side lines SL") laterally extending from the midpoint Ub. An opening part 21ha is formed on a left side of the center line CL and has a substantially rhomboid shape. An opening part 21hb is formed on a right side of the center line CL and has a substantially rhomboid shape. The opening parts 21ha and 21hb are each covered with a punching plate 21p.

The lower covers 22 are exterior parts covering the sides of the engine 12. The lower covers 22 laterally extend from its front end point La to have a gently curved shape with a largest width portion defined at side end points Lw. The lower covers 22 each have an upper half portion with a basically curved surface bulging outward, and have a lower half portion with a basically curved surface recessed inward. The lower cover 22 has a character line (hereinafter, referred to as a "lower side line LL") extending from the front end point La and passing through the side end point Lw. An opening part 22ha is formed above the lower side line LL and has a substantially rhomboid shape. An opening part 22hb is formed below the lower side line LL and has a substantially rhomboid shape. The opening parts 22ha and 22hb are each covered with a punching plate 22p.

The front grille 23 is an exterior part that covers the front side of the engine 12. The front grille 23 is formed with a punching plate 23p attached to a grille frame 23f. The grille frame 23f includes: beam portions 23fL and 23fR extending diagonally upward from its predetermined point Sp; and a pillar portion 23fP extending downward from the predetermined point Sp. The beam portions 23fL and 23fR and the pillar portion 23fP each has a smaller width at a portion farther from the predetermined point Sp and continue to a frame portion 23fG. An opening part 23ha is formed on the left side of the pillar portion 23fP and has a substantially rhomboid shape. An opening part 23hb is formed on the right side of the pillar portion 23fP and has a substantially rhomboid shape. The opening parts 23ha and 23hb are each covered with the punching plate 23p. The punching plates 23p cover three points including: a section defined by the beam portions 23fL and 23fR and the frame portion 23fG; a section defined by the beam portion 23fL, the portion 23fP, and the frame portion 23fG; and a section defined by the beam portion 23fR, the pillar portion 23fP, and the frame portion 23fG. Both sides of an upper portion of the front grille 23 are formed to conform with the shape of high beam light units 24. Both sides of a lower portion of the front grille 23 are formed to conform with the shape of low beam light units 25.

A substantially I shaped center mark 31 is attached to an upper portion of the upper cover 21. A front mask 32 having a substantially Y shape to cover the beam portions 23fL and 23fR and the pillar portion 23fP is attached to a front surface of the front grille 23. Bright plating is performed on the center mark 31 and the front mask 32. This is for achieving an excellent design and for imparting a strong impression to an observer.

Next, an effect obtained with the opening parts 21ha and 21hb is described.

Figure 9:
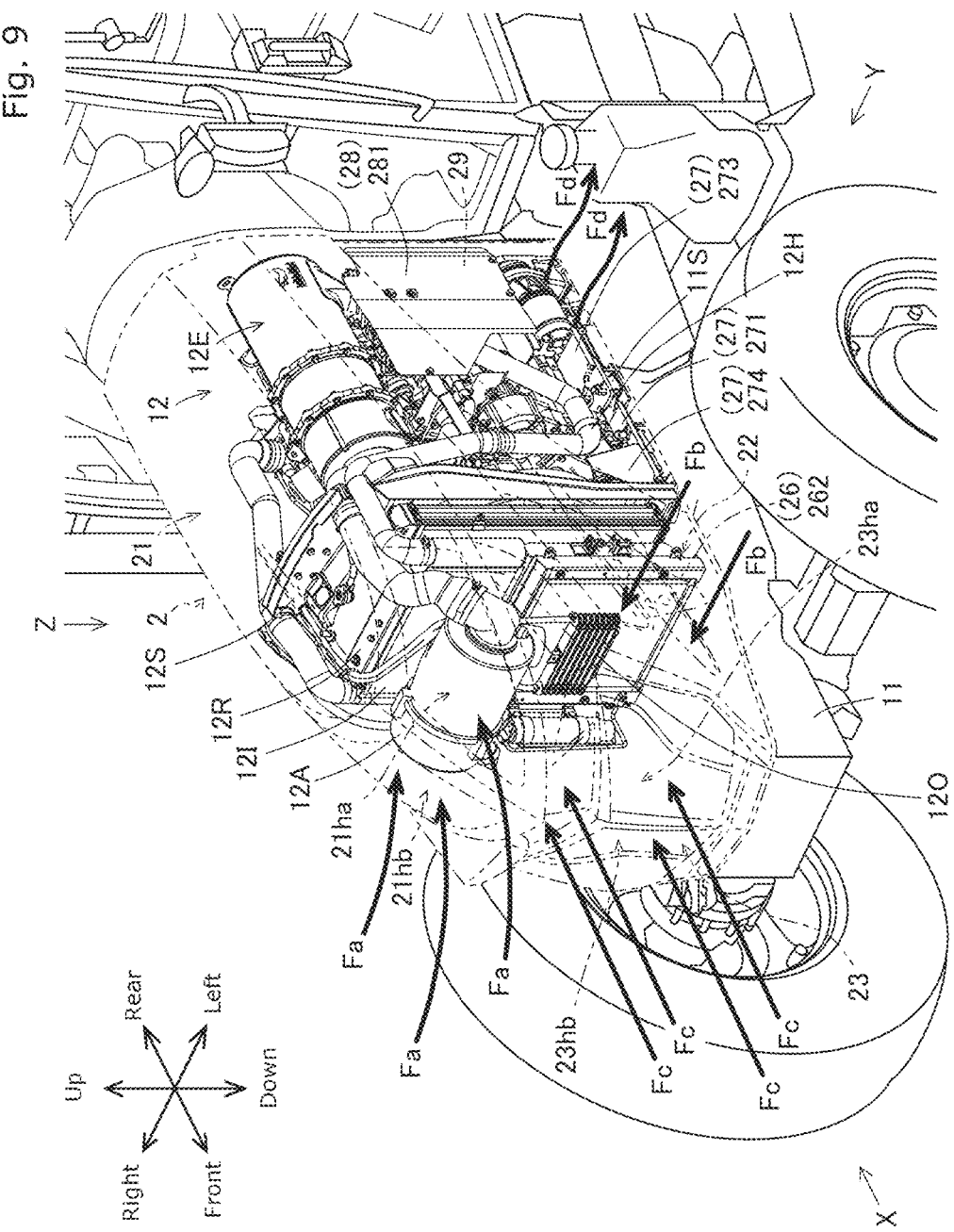
FIG. 9 is a diagram illustrating flows of air into and out of the bonnet.

FIG. 9 illustrates flows of air into and out of the bonnet 2. In the figure, the front and rear direction, the left and right direction, and the upper and lower direction of the tractor 1 are illustrated.

Arrows Fa, Fb, and Fc in the figure indicate flows of air supplied into the bonnet 2 from the outside. An arrow Fd in the figure indicates a flow of air discharged to the outside from the inside the bonnet 2. The arrows Fa, Fb, Fc, and Fd are illustrated in FIG. 8 to FIG. 12.

As described above, the bonnet 2 is provided with the plurality of opening parts 21ha, 21hb, 22ha . . . so that the air can flow into and out of the bonnet 2.

The opening parts 21ha and 21hb on the bonnet 2 are disposed to sandwich the center line CL (see FIG. 5 to FIG. 8). The opening parts 21ha and 21hb are each formed in a large area over the front surface and the side surface of the bonnet 2.

More specifically, the opening part 21ha is formed on the left side of the center line CL and has a substantially rhomboid shape. The opening part 21ha is designed to have a right side extending along the center line CL and a lower side extending along the outline OL. The opening part 21ha is designed to have an upper side extending along the side line SL, and a left side extending along an end line EL of the high beam light unit 24. The end line EL is a straight line extending upward along a rear edge shape of the high beam light unit 24 (see FIG. 7).

The opening part 21hb is formed on the right side of the center line CL and has a substantially rhomboid shape. The opening part 21hb is designed to have a left side extending along the center line CL and a lower side extending along the outline OL. The opening part 21hb is designed to have an upper side extending along the side line SL, and a right side extending along the end line EL of the high beam light unit 24. The end line EL is a straight line extending upward along the rear edge shape of the high beam light unit 24 (see FIG. 7).

The high beam light unit 24 is fit to an upper portion on a front side of the lower cover 22, and is designed to be elongated in the front and rear direction. The upper cover 21 supports no structure such as the high beam light unit 24, and thus features a high degree of freedom in terms of a design for providing the opening parts. All things considered, the opening parts 21ha and 21hb are formed to have a large opening area on the upper cover 21 of the bonnet 2.

As described above, the upper cover 21 has the center line CL formed between the front end point Ua and diagonally-rearward midpoint Ub and the two opening parts 21ha and 21hb formed on both sides of the center line CL. With this configuration, a large opening area on the bonnet 2 can be guaranteed, whereby a higher flowability of air can be achieved.

The flows of air through the opening parts 21ha, 21hb, 22ha . . . are described.

Figure 10:
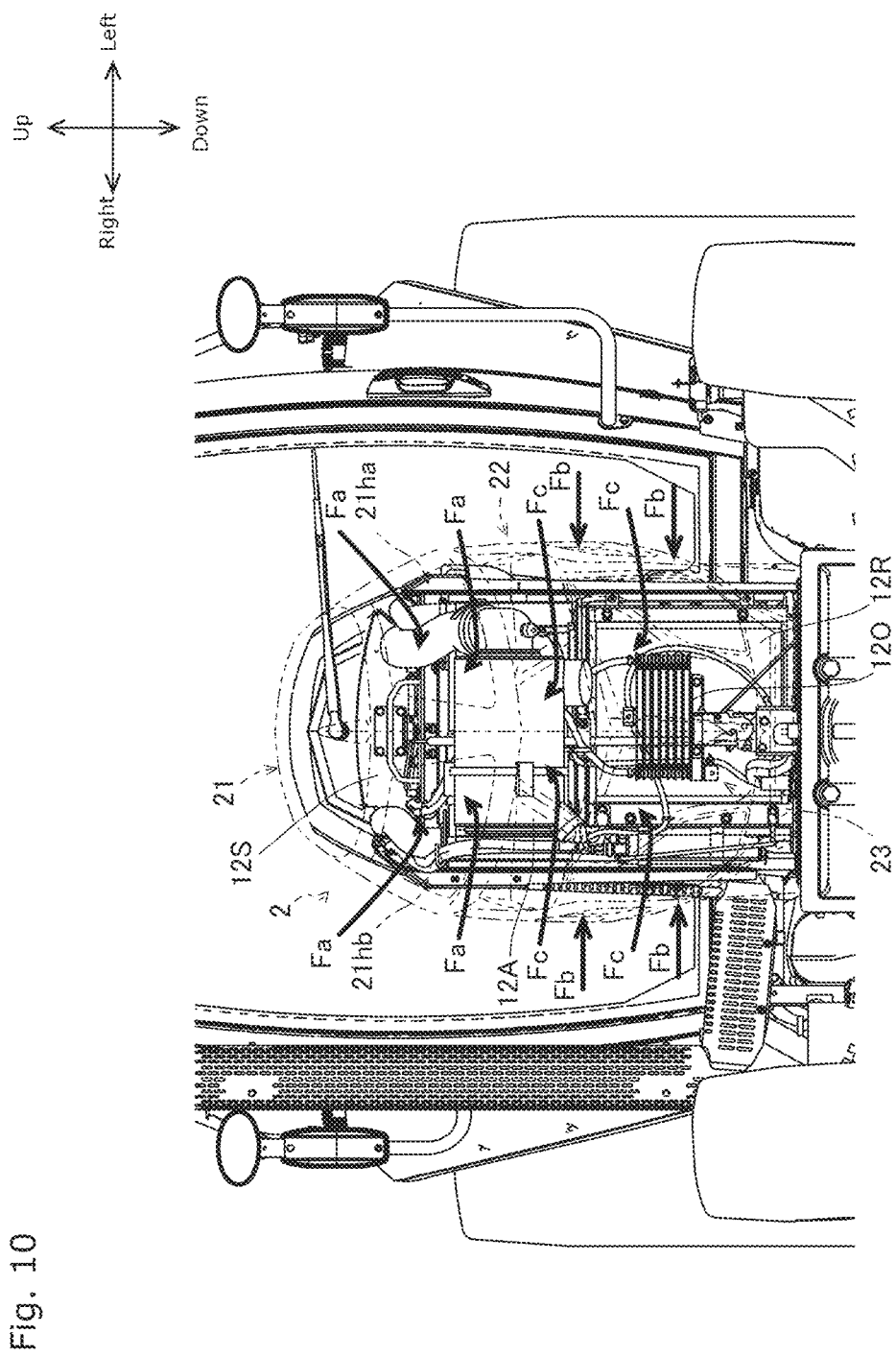
FIG. 10 is a diagram as viewed in a direction of an arrow X in FIG. 9.
Figure 11:
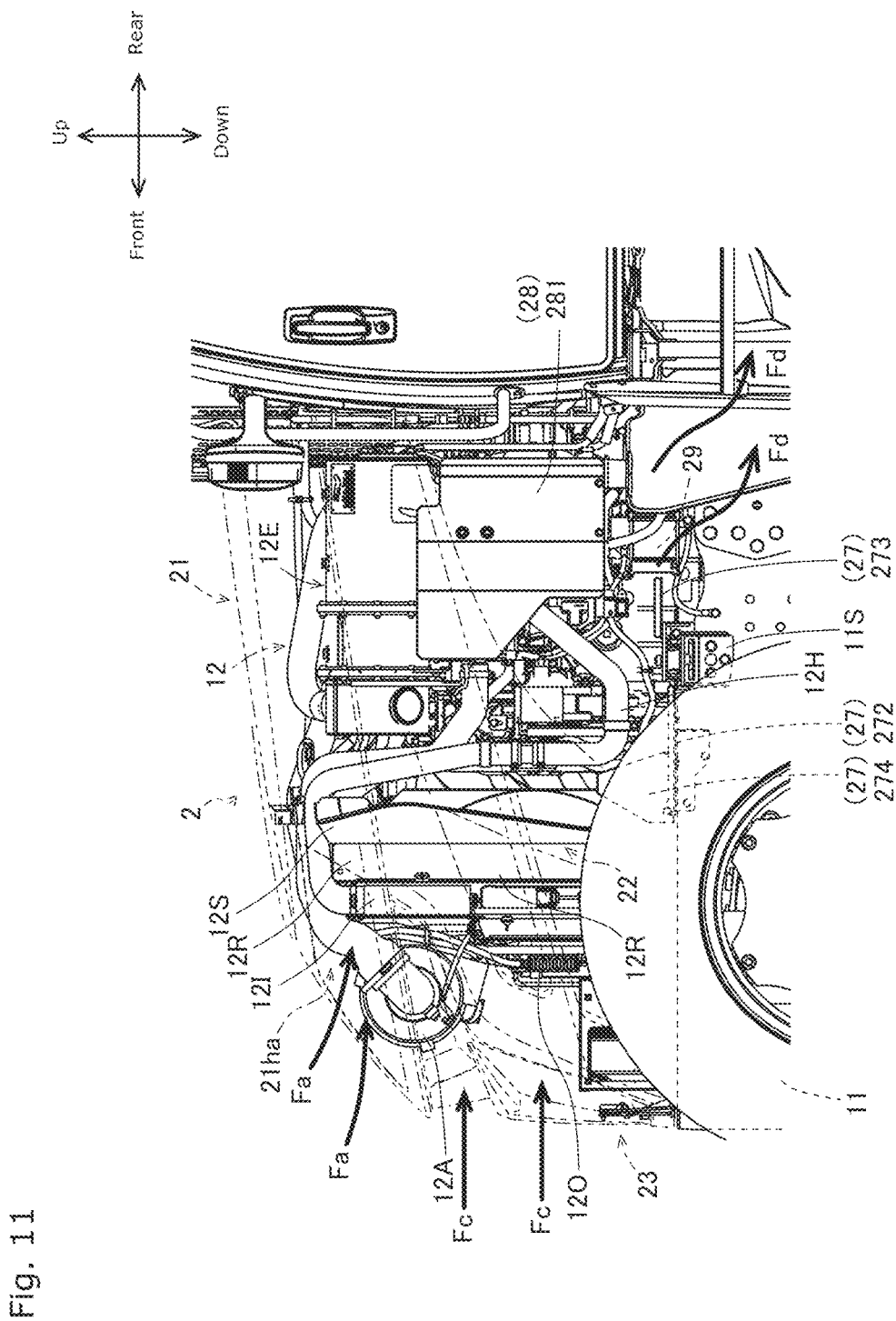
FIG. 11 is a diagram as viewed in a direction of an arrow Y in FIG. 9.
Figure 12:
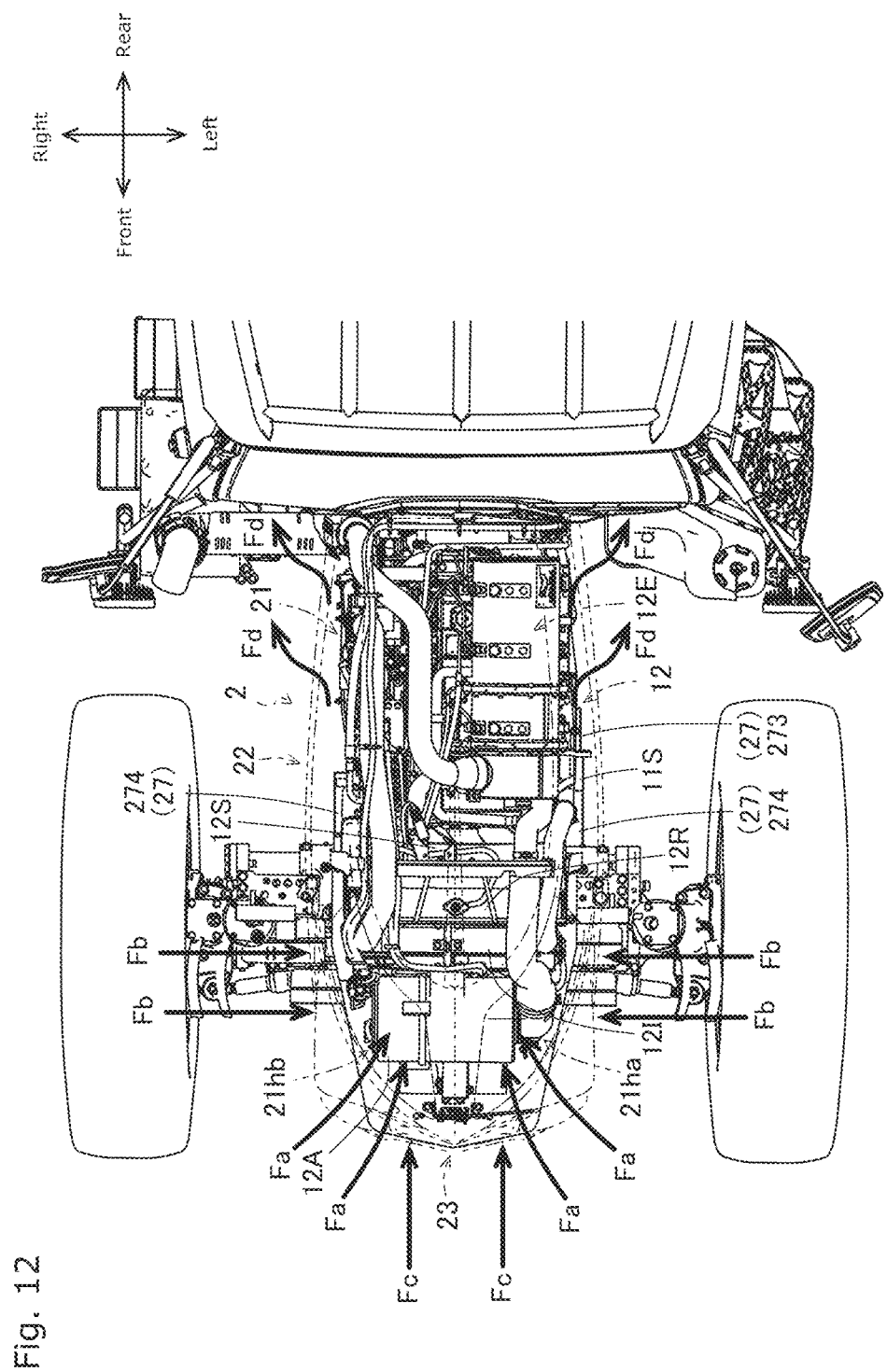
FIG. 12 is a diagram as viewed in a direction of an arrow Z in FIG. 9.
Figure 13:
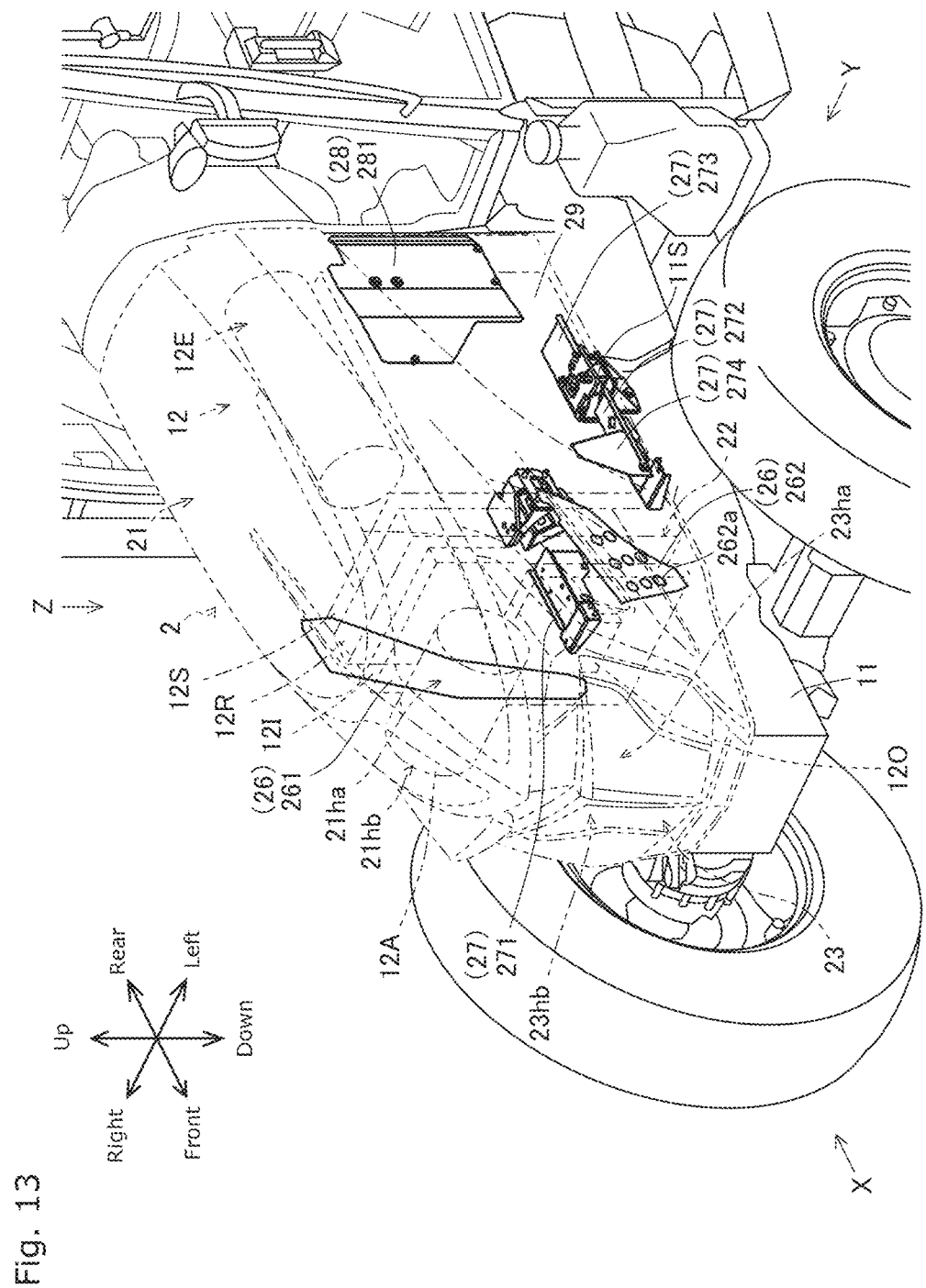
FIG. 13 is a diagram illustrating an internal structure of the bonnet.

FIG. 10 is a diagram as viewed in a direction of an arrow X in FIG. 9. FIG. 11 is a diagram as viewed in a direction of an arrow Y in FIG. 9. FIG. 12 is a diagram as viewed in a direction of an arrow Z in FIG. 9. FIG. 13 illustrates an internal structure of the bonnet 2. In the figures, the front and rear direction, the left and right direction, and the upper and lower direction of the tractor 1 are illustrated.

First of all, the internal structure of the bonnet 2 is briefly described. The engine 12 is installed in the bonnet 2. An air cleaner 12A, an intercooler 12I, an oil cooler 12O and a radiator 12R are disposed on the front side of the engine 12.

The air cleaner 12A filters air supplied to the engine 12. In the air cleaner 12A, air passes through a paper filter, and thus the air is filtered. The air cleaner 12A has a substantially cylindrical shape, and is attached to have a center axis extending in parallel with the left and right direction.

The intercooler 12I cools air compressed by a turbo-charger. In the intercooler 12I, air passes through a tube with a louver to be cooled. The intercooler 12I has a substantially rectangular shape, and has a core attached to be orthogonal with respect to the front and rear direction. In the tractor 1, the intercooler 12I is disposed behind the air cleaner 12A.

The oil cooler 12O cools lubricant oil heated by the engine 12. In the oil cooler 12O, the lubricant oil passes through the tube with the louver to be cooled. The oil cooler 12O has a substantially rectangular shape, and has a core attached to be orthogonal with respect to the front and rear direction. In the tractor 1, the oil cooler 12O is disposed on the lower front side of the intercooler 12I.

The radiator 12R cools a coolant (cooling water) heated by the engine 12. In the radiator 12R, the coolant passes through the tube with the louver to be cooled. The radiator 12R has a substantially rectangular shape, and has a core attached to be orthogonal with respect to the front and rear direction. In the tractor 1, the radiator 12R is disposed behind the intercooler 12I. A fan shroud 12S is attached to the radiator 12R.

Adjustment plates 26 are disposed on both sides of the radiator 12R. More specifically, a pair of left and right flowrate adjustment plates 261 and 262 are disposed on both sides of the radiator 12R.

The flowrate adjustment plate 261 is attached to cover rear edge portions of the opening parts 22ha and 22hb formed on the right lower cover 22. The flowrate adjustment plate 261 is disposed on the front side of the fan shroud 12S, so that a flow of air (cooling air) into the fan shroud 12S can be facilitated. More specifically, the flowrate adjustment plate 261 can prevent the flow of air (cooling air) from stagnating on one side of the fan shroud 12S, and can efficiently guide the flow of air (cooling air) to an intake portion of the fan shroud 12S.

The flowrate adjustment plate 262 is attached to cover a rear half of the opening part 22hb formed on the left lower cover 22. The flowrate adjustment plate 262 is disposed on the front side of the fan shroud 12S, so that a flow of air (cooling air) into the fan shroud 12S can be facilitated. More specifically, the flowrate adjustment plate 262 can prevent the flow of air (cooling air) from stagnating on one side of the fan shroud 12S, and can efficiently guide the flow of air (cooling air) to the intake portion of the fan shroud 12S. The flowrate adjustment plate 262 is provided with a plurality of openings 262a so that a flowrate of the flow of air (cooling air) can be appropriately adjusted.

Guide plates 27 are disposed on both sides of the engine 12. More specifically, a pair of left and right lower guide plates 271 and 272 are disposed on both sides of the engine 12. A lower guide plate 273 is disposed on the left side of the engine 12. Furthermore, a side guide plate 274 is disposed on the left side of the engine 12.

The lower guide plate 271 is attached to cover an opening portion between an upper end of the chassis frame 11 and a lower end of an engine cover 29. The lower guide plate 271 extends rearward from the lower side of the fan shroud 12S, and guides the flow of air (cooling air) from the fan shroud 12S to the engine 12. Thus, the lower guide plate 271 can prevent the flow of air (cooling air) from escaping through a gap between the chassis frame 11 and the engine cover 29, and can efficiently guide the flow of air (cooling air) from the fan shroud 12S to the engine 12. The lower guide plate 271 is fixed to an upper surface of a bracket attached to the chassis frame 11.

The lower guide plate 272 is attached to cover an opening portion between the upper end of the chassis frame 11 and the lower end of the engine cover 29. The lower guide plate 272 extends rearward from the lower side of the fan shroud 12S, and guides the flow of air (cooling air) from the fan shroud 12S to the engine 12. Thus, the lower guide plate 272 can prevent the flow of air (cooling air) from escaping through a gap between the chassis frame 11 and the engine cover 29, and can efficiently guide the flow of air (cooling air) from the fan shroud 12S to the engine 12. The lower guide plate 272 is fixed to an upper surface of a bracket attached to the chassis frame 11.

The lower guide plate 273 is attached to cover an opening portion between the upper end of the chassis frame 11 and the lower end of the engine cover 29. The lower guide plate 273 extends rearward from a front leg member 11S supporting the engine 12, and guides the flow of air (cooling air) along the side surface of the engine 12. Thus, the lower guide plate 273 can prevent the flow of air (cooling air) from escaping through a gap between the chassis frame 11 and the engine cover 29, and can efficiently guide the flow of air (cooling air) along the side surface of the engine 12. The lower guide plate 273 is fixed to an upper surface of the front leg member 11S attached to the chassis frame 11.

The side guide plate 274 is attached to cover a space defined by an upper end of the chassis frame 11, the fan shroud 12S, and an air hose 12H. The side guide plate 274 extends rearward from a side lower portion of the fan shroud 12S, and guides the flow of air (cooling air) from the fan shroud 12S to the engine 12. Thus, the side guide plate 274 can rectify the flow of air (cooling air) formed behind the fan shroud 12S, and can efficiently guide the flow of air (cooling air) from the fan shroud 12S to the engine 12. The side guide plate 274 is fixed to an upper surface of the lower guide plate 271 attached to the chassis frame 11.

With the configuration described above, the flow of air indicated by the arrow Fa is supplied to the inside through the opening parts 21ha and 21hb. The flow of air is guided by the fan shroud 12S and the guide plate 27 to the periphery of the engine 12. The flow of air indicated by the arrow Fb is supplied to the inside through the opening parts 22ha and 22hb. The flow of air is guided by the adjustment plate 26, the fan shroud 12S, and the guide plate 27 to the periphery of the engine 12. The flow of air indicated by the arrow Fc is supplied to the inside through the opening parts 23ha and 23hb. The flow of air is guided by the adjustment plate 26, the fan shroud 12S, and the guide plate 27 to the periphery of the engine 12. These flows of air are guided along the engine 12 by the guide plate 27, and then passes through the opening portion between the upper end of the chassis frame 11 and the lower end of the engine cover 29 to be discharged to the outside (see the arrow Fd). The flow of air passes through the engine cover 29 as a punching plate to be discharged to the outside.

Furthermore, a shielding plate 28 is disposed on one side of the engine 12. More specifically, a side shielding plate 281 is disposed on the left side of the engine 12.

The side shielding plate 281 is attached to cover the turbocharger, an exhaust manifold, an exhaust gas connecting pipe, and an EGR cooler of the engine 12. The side shielding plate 281 extends over a large area so that the turbocharger and the like can be covered, to maintain the turbocharger and the like at a high temperature so that a regeneration performance of the exhaust gas purification device 12E can be prevented from degrading. Thus, the side shielding plate 281 can prevent the turbocharger and the like from being deprived of heat, and thus higher temperature exhaust gas can be sent to the exhaust gas purification device 12E to maintain a purification efficiency. The side shielding plate 281 achieves a lower influence of heat to the periphery so that a failure of a starter that is an electronic device can be prevented. Furthermore, a temperature of the bonnet 6 can be prevented from excessively rising, to eliminate a potential risk of injuries such as a skin burn. The side shielding plate 281 is fixed to a boss provided to the engine 12.

Next, how a high rigidity of the bonnet 2 can be maintained is described.

Figure 14:
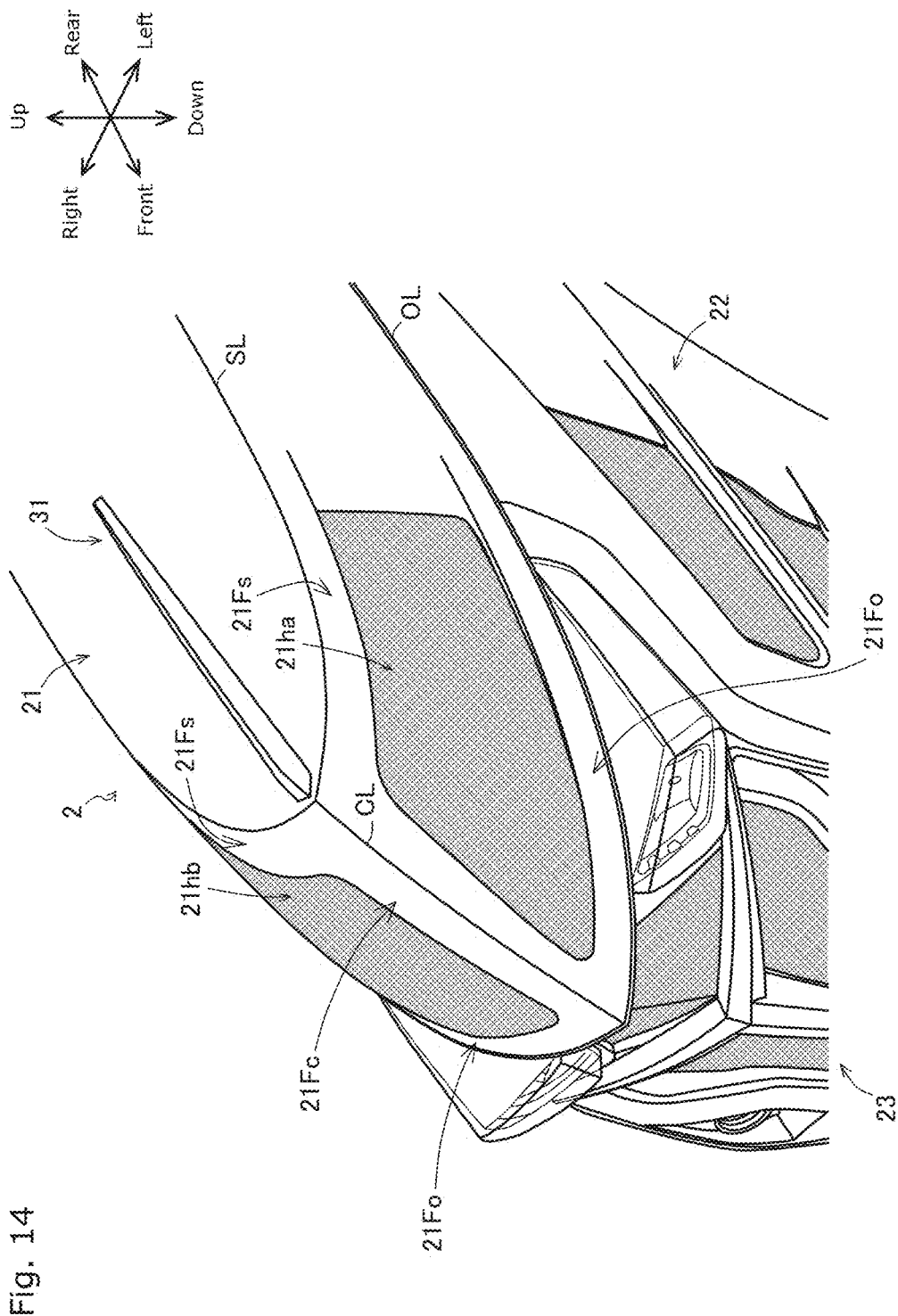
FIG. 14 is an enlarged view of a portion around opening parts.

FIG. 14 is an enlarged view of a portion around the opening parts 21ha and 21hb. In the figure, the front and rear direction, the left and right direction, and the upper and lower direction of the tractor 1 are illustrated.

The center line CL is formed with a portion between the two opening parts 21ha and 21hb bent. Thus, such a portion (hereinafter, referred to as a "center line portion 21Fc") features a larger value of the moment of inertia of area achieving a higher strength compared with a flat shape. The center line portion 21Fc has a shape to be gently curved toward an upper front side, and thus a load applied to the center line portion 21Fc can be dispersed. Thus, stress can be prevented from being concentrated on an end portion of the center line portion 21Fc.

Thus, the opening part 21ha of the bonnet 2 is disposed adjacent to the center line portion 21Fc with a high strength. More specifically, the opening part 21ha is disposed to have a right side extending along the center line CL. The opening part 21hb is disposed adjacent to the center line portion 21Fc with a high strength. More specifically, the opening part 21hb is disposed to have a left side extending along the center line CL.

As described above, the opening parts 21ha and 21hb are each disposed with one side extending along the center line CL. Thus, the bonnet 2 has the center line portion 21Fc serving as a pillar (structural column), whereby a high rigidity can be maintained.

The outline OL is formed with a portion below each opening part (21ha or 21hb) bent. Thus, such a portion (hereinafter, referred to as an "outline portion 21Fo") features a larger value of the moment of inertia of area achieving a higher strength compared with a flat shape. The outline portion 21Fo has a shape to be gently curved toward a front side, and thus a load applied to the outline portion 21Fo can be dispersed. Thus, stress can be prevented from being concentrated on an end portion of the outline portion 21Fo.

Thus, the opening part 21ha of the bonnet 2 is disposed adjacent to the outline portion 21Fo with a high strength. More specifically, the opening part 21ha is disposed to have the lower side extending along the outline OL. The opening part 21hb is disposed adjacent to the outline portion 21Fo with a high strength. More specifically, the opening part 21hb is disposed to have the lower side extending along the outline OL.

As described above, the opening parts 21ha and 21hb are each disposed with one side extending along the outline OL. Thus, the bonnet 2 has the outline portion 21Fo serving as a beam (structural beam), whereby a high rigidity can be maintained.

The side line SL is formed with a portion above each opening part (21ha or 21hb) bent. Thus, such a portion (hereinafter, referred to as a "side line portion 21Fs") features a larger value of the moment of inertia of area achieving a higher strength compared with a flat shape. The side line portion 21Fs has a shape to be gently curved toward a front side, and thus a load applied to the side line portion 21Fs can be dispersed. Thus, stress can be prevented from being concentrated on an end portion of the side line portion 21Fs.

Thus, the opening part 21ha of the bonnet 2 is disposed adjacent to the side line portion 21Fs with a high strength. More specifically, the opening part 21ha is disposed to have the upper side extending along the side line SL. The opening part 21hb is disposed adjacent to the side line portion 21Fs with a high strength. More specifically, the opening part 21hb is disposed to have the upper side extending along the side line SL.

As described above, the opening parts 21ha and 21hb are each disposed with one side extending along the side line SL. Thus, the bonnet 2 has the side line portion 21Fs serving as a beam (structural beam), whereby a high rigidity can be maintained.

INDUSTRIAL APPLICABILITY

The present invention can be applied to a technique of a bonnet.

REFERENCE SIGNS LIST

1 tractor
11 chassis frame
12 engine
13 transmission
14 front axle
15 rear axle
16 cabin
2 bonnet
21 upper cover
21ha opening part
21hb opening part
21Fc center line portion
21Fo outline portion
21Fs side line portion
22 lower cover
23 front grille
CL center line
OL outline
SL side line

The invention claimed is:

1. A bonnet of a tractor comprising:
an upper cover; and
a pair of lower covers,
a front grill;
a pair of left and right high beam light units; and
a pair of low beam light units;
wherein the upper cover:
has a center line extending between a front end point to a diagonally-rearward midpoint, and
is provided with a first opening part and a second opening part sandwiching the center line each opening part being covered with a punching plate; and
wherein:
one of the high beam light units is coupled to an upper portion of each lower cover and extends rearward from a front side of each lower cover;
an upper portion of the front grill extends between the pair of high beam light units;
a lower portion of the front grill extends between the pair of low beam light units;
the first opening part is formed on the left side of the center line, the first opening part comprises:
a right side that extends along the center line; and
a left side that extends along an end line of the left high beam light unit;
the second opening part is formed on the right side of the center line, the second opening part comprises:
a left side that extends along the center line; and
a right side that extends along an end line of the right high beam light unit.

2. The bonnet according to claim 1, wherein:
an outline is formed on the upper cover to laterally extend from the front end point, and
the opening parts are each disposed with a lower side extending along the outline.

3. The bonnet according to claim 1, wherein:
a side line is formed on the upper cover to laterally extend from the midpoint, and
the opening parts are each disposed with an upper side extending along the side line.

4. The bonnet according to claim 1, wherein a center mark is attached to an upper portion of the upper cover.

5. The bonnet according to claim 1, wherein the end line of each of the left and right high beam light units extends upward along a rear edge shape of each light unit.

6. A bonnet of a vehicle comprising:
an upper cover comprising a center line that extends rearward from a front end point to a midpoint, where the upper cover defines a first opening and a second opening disposed on opposing sides of the center line;
a pair of left and right lower covers coupled to the upper cover; and
a left high beam light coupled to an upper portion of the left lower cover, the left high beam light interposed between a front side of the upper cover and a front side of the left lower cover;
a right high beam light coupled to an upper portion of the right lower cover, the right high beam light interposed between the front side of the upper cover and a front side of the right lower cover;
a front grill extending between the left high beam light and the right high beam light;
wherein the first opening comprises:
a right side that extends along the center line; and
a left side that extends in a direction substantially parallel to an end line of the left high beam light;
wherein the second opening comprises:
a left side that extends along the center line; and
a right side that extends in a direction substantially parallel to an end line end line of the right high beam light; and
the midpoint is positioned vertically above and rearward of the front end point.

7. The bonnet according to claim 6, wherein each of the first and second openings are defined by the upper cover between the front end point and the midpoint.

8. The bonnet according to claim 6, wherein:
the upper cover comprises a side line that laterally extends rearward from the midpoint, and
a top side of each of the first and second openings extends along the side line.

9. The bonnet according to claim 6, wherein:
the upper cover comprises an outline that laterally extends rearward from the front end point,
the outline defines a bottom edge of the upper cover, and
a bottom side of each of the first and second openings extends along the outline.

10. The bonnet according to claim 6, wherein each of the first and second openings defined by the upper cover have a substantially rhomboid shape.

11. The bonnet according to claim 6, wherein a punching plate covers each of the first and second openings.

12. The bonnet according to claim 6, further comprising a pair of low beam lights, wherein a lower portion of the front grill extends between the pair of low beam lights.

13. A tractor comprising:
an engine; and
a bonnet configured to cover the engine, the bonnet comprising:
an upper cover comprising a center line that extends rearward from a front end point to a midpoint, where the upper cover defines a first opening and a second opening disposed on opposing sides of the center line;
a pair of left and right lower covers coupled to the upper cover; and
a left high beam light coupled to an upper portion of the left lower cover, the left high beam light interposed between a front side of the upper cover and a front side of the left lower cover;
a right high beam light coupled to an upper portion of the right lower cover, the right high beam light interposed between the front side of the upper cover and a front side of the right lower cover;
a front grill extending between the left high beam light and the right high beam light;
wherein the first opening comprises:
a right side that extends along the center line; and
a left side that extends in a direction substantially parallel to an end line of the left high beam light;
wherein the second opening comprises:
a left side that extends along the center line; and
a right side that extends in a direction substantially parallel to an end line end line of the right high beam light; and
wherein the midpoint is positioned vertically above and rearward of the front end point.

* * * * *